United States Patent [19]

Matsumoto et al.

[11] Patent Number: 4,945,438
[45] Date of Patent: Jul. 31, 1990

[54] COMBINED MAGNETIC HEAD

[75] Inventors: Takashi Matsumoto; Taichi Takesa, both of Tokyo, Japan

[73] Assignee: Fuji Photo Film Co., Ltd., Kanagawa, Japan

[21] Appl. No.: 185,663

[22] Filed: Apr. 25, 1988

[30] Foreign Application Priority Data

Apr. 24, 1987 [JP] Japan .............................. 62-100114
Apr. 24, 1987 [JP] Japan .............................. 62-100115

[51] Int. Cl.$^5$ ............................................. G11B 5/29
[52] U.S. Cl. .................................. 360/121; 360/21; 360/76; 360/77.12; 360/119
[58] Field of Search ............... 360/121, 119, 76, 21, 360/77.12, 77.06, 10.3

[56] References Cited

U.S. PATENT DOCUMENTS 4,149,198  4/1979  Behr et al. ..................... 360/76 X
4,347,534  8/1982  Kimura ........................... 360/21 X
4,633,332 12/1986  Higurashi et al. ............... 360/21 X

FOREIGN PATENT DOCUMENTS 58-194106 11/1983  Japan ............................. 360/21
58-203612 11/1983  Japan ............................. 360/76
63-58609   3/1988  Japan ............................ 360/121

Primary Examiner—John H. Wolff
Attorney, Agent, or Firm—Sughrue, Mion, Zinn, Macpeak & Seas

[57] ABSTRACT

A combined magnetic head for recording a data track on a guard band between main tracks of a floppy disk. A guard band data head for data tracks is positioned above the guard band and has a width so as to record satisfactorily data on the guard band without degrading recorded information on the main tracks irrespective of whether the recording is performed with the data head stretching over the main tracks. The width is preferably between 40% and 60% of the guard band.

6 Claims, 7 Drawing Sheets

COMBINED MAGNETIC HEAD

BACKGROUND OF THE INVENTION

1. Field Of The Invention

The present invention relates generally to magnetic heads. In particular, it relates to a dual magnetic head for recording both a video signal on a main track and an audio signal on the guard band between the main tracks.

2. Background Art

When recording data on a magnetic disk, such as a floppy disk, the information is recorded on circular tracks during rotation of the floppy disk. Furthermore, a guard band is generally provided between two adjacent tracks so as to absorb any tracking error due to expansion and contraction of the floppy disk occurring with variations of temperature and humidity or due to the positioning error arising from the inaccuracy of the head-tracking mechanism.

Various types of recording apparatus for a floppy disk have been developed in the past. A well known one of these is a still picture recording apparatus, particularly a so-called electronic camera, in which an image of an object taken through a lens is converted into an electronic signal which is in turn recorded on the floppy disk. Such a floppy disk is called a video floppy. For reproduction there is known an apparatus which rotates the floppy disk and reproduces the image signal as a still picture on a display device such as television picture screen, where the image signal for one field is recorded on one circular track. A method of reproducing a still picture with the one-field image signal is referred to as field recording and reproduction. On the other hand, an alternative method records each of two fields of a frame on two tracks and reproduces a still picture on the basis of one frame produced by the image signal on the two tracks. This method is designated as a frame recording and reproduction method. According to the standard for electronic still cameras, the floppy disk is rotated at a speed of 3600 rpm and has tracks with widths of 60 micrometers which are concentrically formed at intervals of 100-micrometer pitch. The nominal width of the guard band is 40 micrometers, and the tolerance of the track radius for the expansion and contraction of the floppy disk and the tracking accuracy error is ±4 micrometers.

On the other hand, in the case of displaying a still picture on a television picture, screen or the like, an audio signal including data such as voice data and music data recorded in correspondence with an image signal is generally reproduced simultaneously with the video signal. Techniques of recording such information in the guard band are proposed in Japanese Patent Provisional Publication No. 61-129701 and Japanese Patent Provisional Publication No. 61-153803. More specifically, conventional tracks are used as main tracks for recording of the image signal and a data signal such as a voice is time-compressed and recorded on a guard band between the main tracks. The data signal is recorded at an azimuth with the main tracks and the guard bands. The information signal recorded by way of time-compression is time-restored after being reproduced. A magnetic head (main head) for recording an image signal on the main track and a magnetic head (data head) for recording a data signal on the guard band may be separate from each other or constructed integrally as shown in Japanese Patent Provisional Publication No. 61-129701.

The data signal including data such as voice, after the corresponding image signal is recorded on a main track, is recorded on a guard band adjacent to the main track.

As described above and illustrated in FIG. 12, recording is performed such that, for example, a main track 2 has a width of 60 micrometers and a guard band 4 has a width of 40 micrometers. However, in two extreme cases, the guard band is effectively reduced to a minimum width. In the first case, a floppy disk 1 containing the main tracks 2 and the guard band 4 contracts to the maximum allowable extent and the tracking accuracy greatly deteriorates in one direction when an image signal is recorded on one main track. In the second case, the floppy disk 1 expands to the maximum allowable extend, and, the tracking accuracy also greatly deteriorates, but in the opposed direction when an image signal is recorded on the next main track 2. Because of the allowed expansion and contraction, a non-recorded portion to be used as the guard band 4 has a width of $40-(14\times2)$ micrometers, i.e., 12 micrometers. Consequently, when data is recorded on the guard band 4 by means of the data head arranged to form a track with a width of 40 micrometers, the data track overlaps by 14 micrometers with each of both the main tracks 2.

In such a case, not only the data recording made by the data head becomes unsatisfactory, but also the signal on the overlapped portions 3 of the main tracks 2 is degraded.

SUMMARY OF THE INVENTION

The present invention has been developed in order to eliminate the above-mentioned problems and provides a combined magnetic head which is capable of excellently recording predetermined data on a guard band without degrading the recorded signals on the main tracks irrespective of the off-tracking of the guard band recording magnetic head with respect to the main tracks which causes partial overlapping of the information.

The present invention can be summarized as a combined magnetic head arranged so that, in the case that data is recorded on a guard band formed between circular main tracks of a magnetic disk, excellent recording and reproduction can be performed without deterioration of recorded information irrespective of partially overlapped recording of information due to the off-tracking of the guard band recording magnetic head with respect to the main tracks.

BRIEF DESCRIPTION OF THE DRAWINGS

FIGS. 1 through 7 show embodiments of the present invention and their associated circuitry and effects.

FIG. 2 is an illustration of a main head.

FIG. 4 is an illustration of C/N versus frequency for an audio head.

FIG. 5 is an illustration for describing the minimum data head width.

FIG. 6 is an illustration for describing the maximum data head width.

FIG. 7 is a block diagram showing a tracking circuit.

DESCRIPTION OF THE PREFERRED EMBODIMENTS

In accordance with the present invention, there is provided a combined magnetic head including main heads for recording main tracks which are separated from each other in the width direction of the tracks and further including a data head having a width of about 2/5 to 3/5 times the separated distance.

In accordance with the present invention, there is further provided a combined magnetic head arranged such that two main heads are provided to be separated from each other to form an interval therebetween and are disposed along a line in the track-width direction. A data head in the combined head has a width less than the interval between the two main heads, is adjacent to one of the two main heads with respect to the middle of the interval, and is formed at an azimuth with respect to the two main heads.

The information recorded on the main tracks is usually an image signal, but may be basically any desired signal. Furthermore, although the data recorded on the guard band can be determined freely, when an image signal is recorded on the main track, an audio signal processed by the time-compression is generally recorded on the guard band.

This invention was made in the context of the standards that the width of a main track for a main head is T (=60 micrometers) and the width of a guard band between the main tracks is 2T/3 (=40 micrometers). Furthermore, the tracking slippage including both the influence of temperature and humidity on the floppy disk and the positioning error, i.e., tracking accuracy error, is determined as ±T/4 (about 14 micrometers).

A detailed description for elimination of the problems will be made hereinbelow with reference to, for example, one of the standardized still video floppy disk systems. It will be assumed that a main head records a main track with a width of 60 micrometers and that the width of the resultant guard band is 40 micrometers. Furthermore, the length of a data head in the track width direction is approximately 16 to 26 micrometers and the data head is positioned in the center of the guard band. In addition, the tracking slippage including the influence of temperature and humidity on the floppy disk and the tracking accuracy error, i.e., positioning error, is set at ±14 micrometers in accordance with the standard. As a result, as described above, 12 micrometer non-recorded portions are present in the worst off-tracking state.

Figure 2:
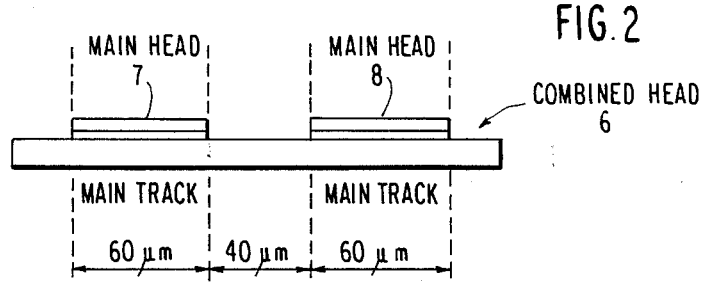

Audio information and so on are recorded on the non-recorded portion whose width ranges from 12 micrometers to 40 micrometers. In the case that the information recording is performed after recording of the successive main tracks, a frame recording magnetic head is used whereby one track is formed for one field, one picture being formed by two fields. The frame head is preferably arranged as a combined head 6, as shown in FIG. 2, which forms two main tracks separated by a guard band and in which main heads 7 and 8 may be positioned to be separated by 40 micrometers from each other. When each of the main heads 7 and 8 of the combined head 6 is used for one field so as to effect frame recording, the guard band between the main heads 7 and 8 is kept to 40 micrometers in width but outer portions of the main head 7 and 8 which are displaced on top of the adjacent guard bands cannot maintain the 40 micrometer guard band width because of the tracking slippage and so on. Furthermore, in the case that the frame recording is made by each of the main heads 7 and 8 of the combined head 6 shown in FIG. 2, the main heads 7 and 8 are not used at the exact same time, resulting in ready occurrence of tracking dislocation and so on. Therefore, not only for field recording but also for frame recording performed by the combined head 6 shown of FIG. 2, there is the possibility that the above-mentioned minimum 12 micrometer non-recorded portion is present because of off-tracking.

Figure 3A:
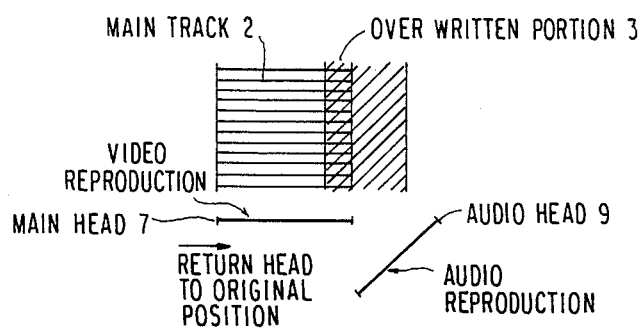
FIG. 3(a) shows a diagram for describing the tracking dislocation amount and FIG. 3(b) is a graphic diagram showing a video Y-S/N reduction.
Figure 3B:
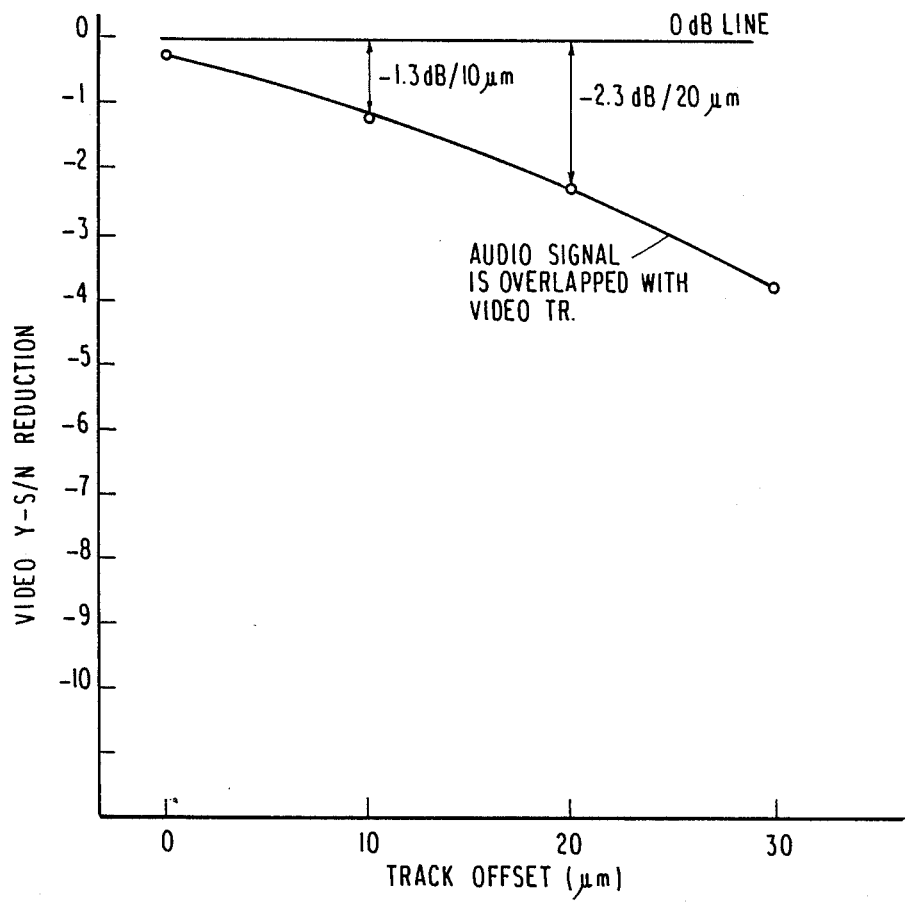

When recording data on the 12 micrometer non-recorded portion which is present in the maximum off-tracking state, there is the possibility that the data can be overwritten on the recorded main tracks and problems may arise in reproduction of the data from the main tracks. The present inventor performed an experiment, in which, as shown in FIG. 3(a), an audio head 9 was oriented at an azimuth of 45° and had a head width of 40 micrometers in the track-width direction. The audio head 9 was slowly moved off-track so as to form the overwritten portion 3 over the previously recorded video signal on the main track 2. As shown in FIG. 3(b), with a track offset of about 10 micrometers, the S/N of the video Y signal decreased in the amount of approximately −1.3 dB. Furthermore, according to a further experiment when the reduction was about 1 dB, corresponding to an overlapped portion of 10 micrometers it has been found that the data of the main track can be read without providing any problems. Consequently, if adding allowed tracking slippage amounts of ±10 micrometers to 12 micrometers which is the width of the non-recorded portion with maximum off-tracking it is allowed that the head width in the track-width direction is 10+10+12 micrometers, i.e. 32 micrometers. The width with respect to one side of the track is allowed to be 10+12 micrometers, i.e., 22 micrometers, in the track width direction.

Figure 4:
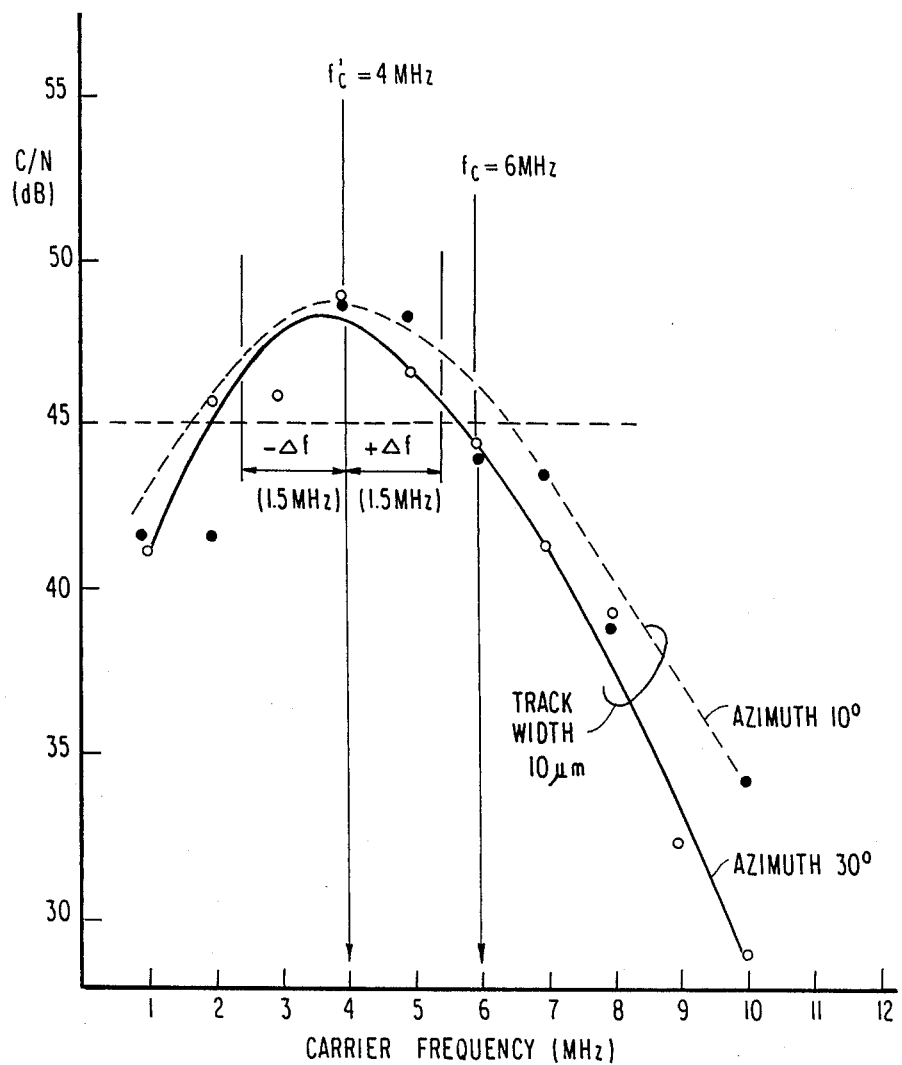

Satisfactory recording of a signal of the data track must also be considered. It has been found that the FM demodulation input C/N over 45 dB is required in order to obtain the voice S/N of over 43 dB. which is a desirable level. According to a further experiment by the present inventor, when the track width is less than 10 micrometers, in accordance with the required width of a recording frequency band and with the characteristics shown in FIG. 4, it is known that it is impossible that the FM demodulation threshold C/N can be made to exceed 45 dB. That is, in a frequency band of 6 MHz±1.5 MHz, it is required that the head width is 15 micrometers in order to result in the audio S/N being desirably over 43 dB in the FM system. It has been further found, as shown in FIG. 4, that the result that the demodulation threshold C/N is over 54 dB is obtained with the head width of 10 micrometers with a frequency band of 4 MHz±1.5 MHz. Therefore, in the case of the band being 4 MHz,±1.5 MHz, it is required that the head width be more than 10 micrometers.

Figure 5:
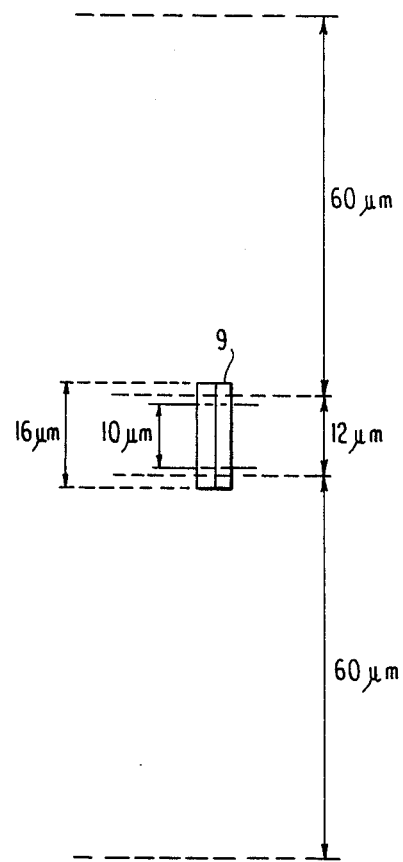
Figure 6:
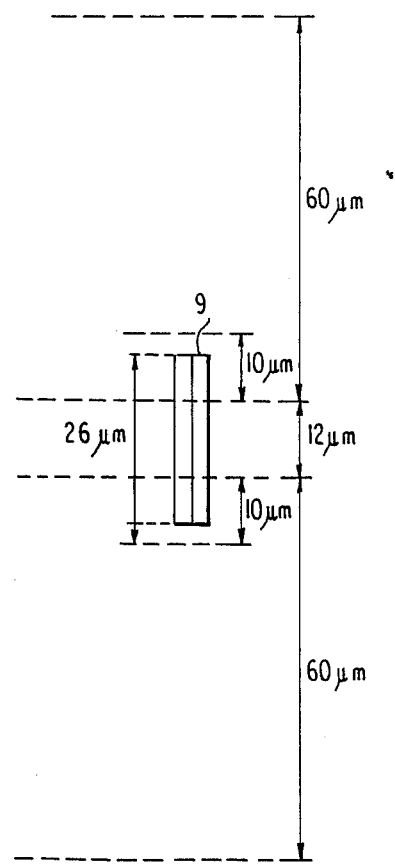

Thus, in the arrangement in which a data head is provided at the center of a guard band between two main heads, the width of the data head is set as shown in FIGS. 5 and 6 so as to cause the data head to record data such as voice excellently and further to cause it to not degrade data on the main tracks. That is, as shown in FIG. 5, with the head width of 16 micrometers being the sum of the required track width of 10 micrometers and the tracking error of ±3 micrometers, high quality data recording and reproduction can be obtained. Overlapping of the guard band data with the main track is only 4 micrometers even at the maximum allowed off-tracking with the recording portion of information being only 12 micrometers. Both excellent effects are obtained. Therefore, the necessary width of the data head is at least 16 micrometers.

On the other hand, in the case that a narrow track of 12 micrometers is obtained with maximum tracking dislocation due to temperature and humidity conditions as well as tracking accuracy error, the resultant width is 32 micrometers, which is obtained by adding ±10 micrometers, which is the amount by which overwriting on the main track is allowed. However, if the tracking accuracy error of the data head itself is taken into consideration, which is ±3 micrometers, the data track width of 32-6, i.e., 26 micrometers, is required as shown in FIG. 6. Therefore, it is understood that, when the largest and smallest values of the data head width in the track-width direction are 26 micrometers and 16 micrometers, excellent information recording can be effected, and there is no influence on the main track.

In the above description with reference to FIGS. 5 and 6, the azimuth has not been considered and it has been assumed that the width direction of the data head 9 and the track width direction are coincident with each other. However, if taking into account the fact that the overwritten signals can be respectively reproduced due to the azimuth loss, crosstalk is reduced when the data head 9 is inclined with respect to the main head to make an azimuth angle therebetween. On the contrary, the effective recording wavelength becomes shorter in accordance with an increase in the azimuth angle, and hence the data reproduction frequency characteristic is lowered, thus resulting in the fact that there is a limit in the magnitude of the azimuth angle. According to experiments by the present inventor it has been found that there is no problem if the range of the azimuth angle is $\theta = 10°$ to $40°$. However, in this invention, the width of the data head is set under the extreme conditions of occurrence of the utmost off-tracking irrespective of the guard band width of 40 micrometers normally obtained. Therefore, it can be considered that, in practice a zero azimuth angle for the data head causes no problem.

Although in the above description the tracking accuracy is ±3 micrometers resulting in a so-called servo error of ±3 micrometers, the expansion and contraction of the magnetic disk due to the temperature and humidity variations, which are another cause of the tracking dislocation, are dependent upon the diameter and material of the magnetic disk. For example, a magnetic disk used in an electronic still camera has a diameter of 47 mm and is made of polyethylene, which is a material generally used therefor. If the contraction rate is added to the tracking accuracy, the expansion and contraction value is about 10 micrometers. Furthermore, humidity causes an isotropic deformation (radial portions of a circular disk are regularly deformed) and temperature causes an anisotropic deformation in which a radial portion of a circular disk is irregularly deformed as compared with the other radial portions. However, because this magnetic disk is a rotating body, the difference between these deformations does not provide a great problem.

Figure 7:
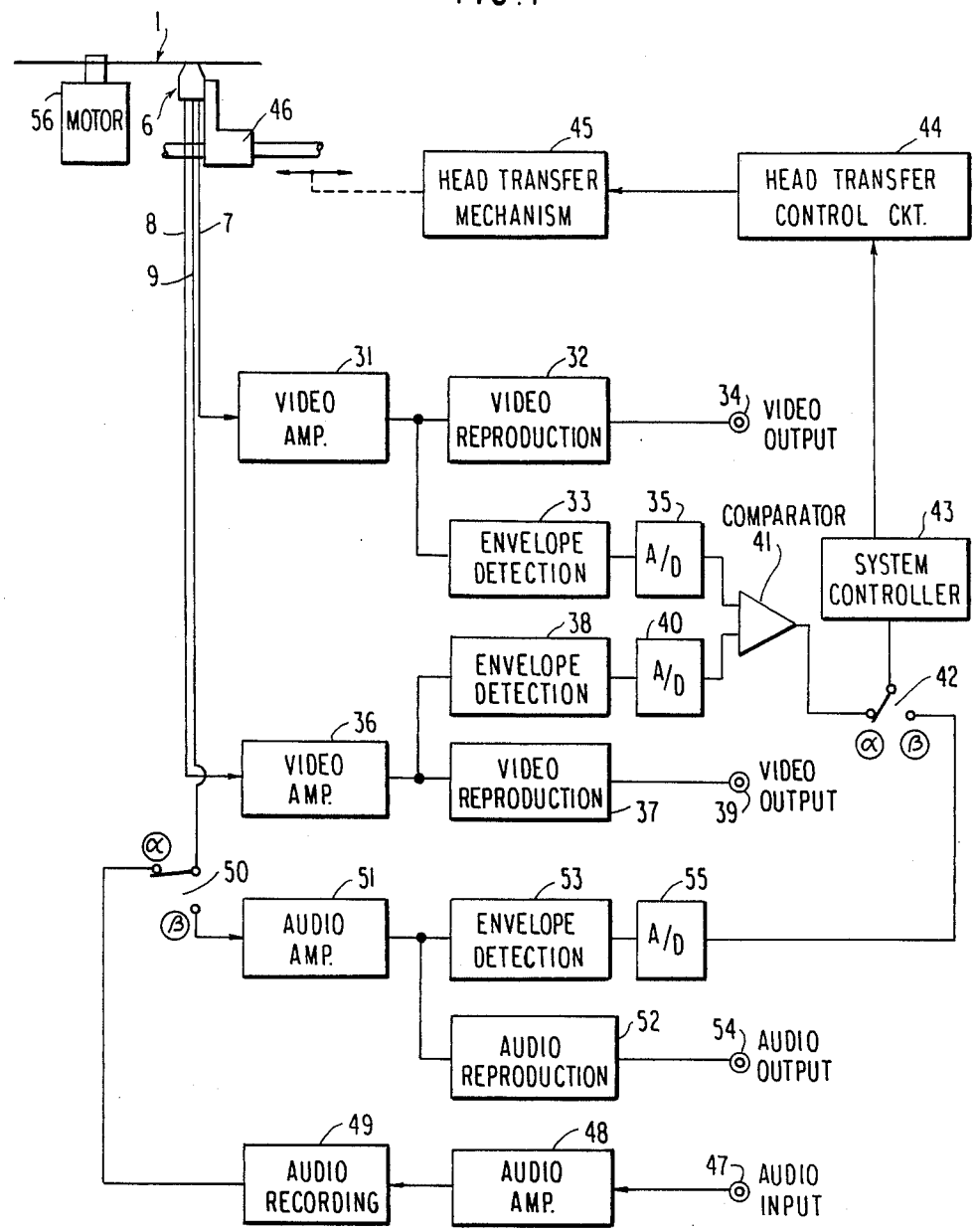

Hereinbelow a description will be made in terms of the tracking of the data head. The case is described in which the tracking of the data head is effected by the recorded main track. That is, an image signal is recorded on the main track, and a voice signal is recorded by the data head. An apparatus shown in FIG. 7 is arranged such that, irrespective of the degree of the width of the guard band, a voice signal is recorded on a guard band of a floppy disk 1 in which image signals are recorded on successive first and second main tracks separated by the guard band. These image signals and the voice signal are simultaneously reproduced by means of a three-channel magnetic head 6.

The apparatus using the magnetic head 6 is shown in FIG. 7. An FM image signal is the output signal of the first video head 7 and is amplified by a video amplifier 31, and thence supplied to a video reproduction circuit 32 and an envelope detection circuit 33. The video reproduction circuit 32 demodulates the FM image signal and supplies it to a video output terminal 34. On the other hand the envelope detection circuit 33 detects the envelope of the FM image signal and supplies the result to an A/D converter 35. A FM image signal which is the output signal of the second video head 8 is processed similarly. Therefore, there are included another set having a video amplifier 36, a video reproduction circuit 37, an envelope detection circuit 38, a video output terminal 39, and an A/D converter 40.

A comparator 41 compares the levels of the output signals of both the A/D converters 35 and 40 to supply a signal corresponding to the difference therebetween through a switch 42 to a system controller 43. The system controller 43 moves, in a radial direction of the floppy disk 1, a head carriage 46, to which the magnetic head 6 is rigidly secured. The control is effected through a head transfer control circuit 44 and a head transfer mechanism 45 in such a way that the output levels of the A/D converters 35 and 40 become equal and maximal. The above control is performed in the case that the switch 42 is set at contact point $\alpha$.

A time-compressed FM voice signal is supplied through an audio input terminal 47, an audio amplifier 48, an audio recording circuit 49, and a switch 50 to the audio head 9. At this time, since the FM voice signal is voice data corresponding to image data on the first main track picked up by the first video head 7, the time-compression is performed so that the recording is made during one revolution of the floppy disk 1. The above is the case that the switch 50 is set at the contact point $\alpha$.

On the other hand, the time-compressed voice signal which is the output signal of the audio head 9 is supplied through the switch 50 to an audio amplifier 51 to amplify it and from thence supplied to an audio reproduction circuit 52 and an envelope detection signal 53. The audio reproduction circuit 52 FM demodulates the FM voice signal and then time-expands it to return it to the original voice signal which is in turn supplied to an audio output terminal 54. On the contrary, the envelope detection circuit 53 detects the envelope of the FM voice signal and supplies the result to an A/D converter 55. In response to supply of the output signal of the A/D converter 55, the system controller 43 moves the head carriage 46 similarly by means of the head transfer control circuit 44 and the head transfer mechanism 45 so that the output level of the A/D converter 55 assumes a maximum. The above description is for when both the switches 42 and 50 are set to contact points β. In the drawing, a motor 56 drives the floppy disk 1.

In the above-mentioned apparatus, when a voice signal is recorded on a guard band, the switches 42 and 50 are both set to the contact points α. Under this condition, a voice signal is supplied to the audio input terminal 47 and image signals on the first and second video heads 7 and 8. At this time, the system controller 43 adjusts the position of the magnetic head 6 so that the difference between the output levels of the A/D converters 35 and 40 becomes zero. More specifically, the tracking servo is performed such that the audio head 9 is placed at the position that the center of the audio head 9 in the track-width direction is between the centers of the first and second main tracks in the track-width direction. More particularly, the separated distances are equal to each other.

On the other hand, in reproducing the audio signal and the image signal, the switches 42 and 50 are set to the contact points β. With this state, the image signals on the first and second main tracks are reproduced through the first and second video head 7 and 8 and the voice signal on the guard band is reproduced through the audio head 9. At this time, the system controller 43 adjusts the position of the magnetic head 6 so that the output level of the A/D converter 55 assumes a maximum. That is, the tracking servo is performed such that the audio head 9 is placed on the center of the guard band in the width direction. Thus, tracking is effected by the video reproduction output during the recording of the voice signal and effected by the voice signal itself during the reproduction of the voice signal. The above description has been made in the case that the audio head 9 is provided between the first and second video heads for the adjacent two main tracks.

Figure 8:
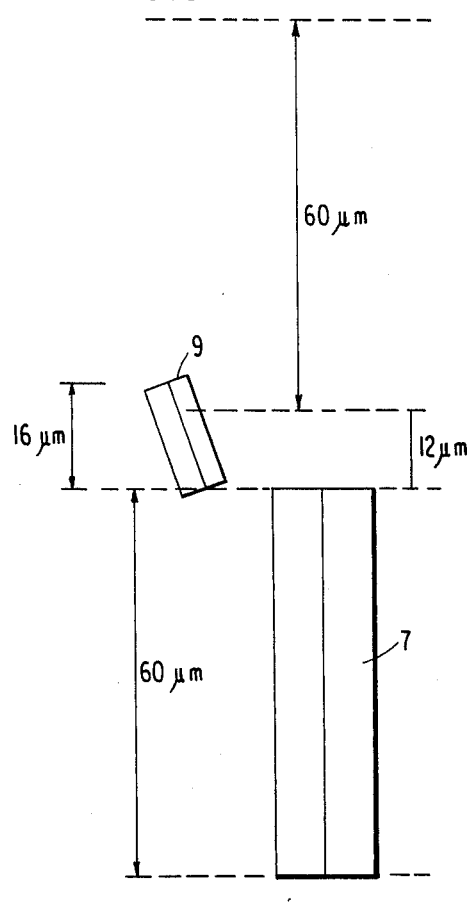
FIG. 8 is another illustration the minimum information head width.

A further description will be made for an arrangement in which a data head 9 is capable of excellently recording data such as voice data but which does not degrade data on the adjacent main tracks. The arrangement in which the data head is adjacent to one main head will be described with reference to FIGS. 8 to 10. That is, similarly to the case in FIGS. 5 and 6, a head width of 16 micrometers is used which is the sum of the track width of 10 micrometers necessary for the voice reproduction and the tracking accuracy error of ±3 micrometers on recording and reproduction of data such as voice data. With such a head width, it is possible to perform excellent recording and reproduction of the data and, further, the overlapping of the data head 9 with the main track is only 4 micrometers irrespective of the non-recorded portion of 12 micrometer width at the maximum off-tracking. Therefore, the necessary data head width in the track-width direction is 16 micrometers at a minimum. That is, for data recording in the guard band, the tracking of the magnetic data head 9 is controlled according to reproduction from the main track by the adjacent main head 7. This tracking error is absorbed in the 12 micrometer non-recorded portion width. When during data reproduction the tracking is effected by the data head 9 itself for the guard band track, a tracking error of ±3 micrometers may be created. Thus, the data head 9 is required which is adjacent to one end of the main head and has a head width of a minimum of 16 micrometers.

Figure 9:
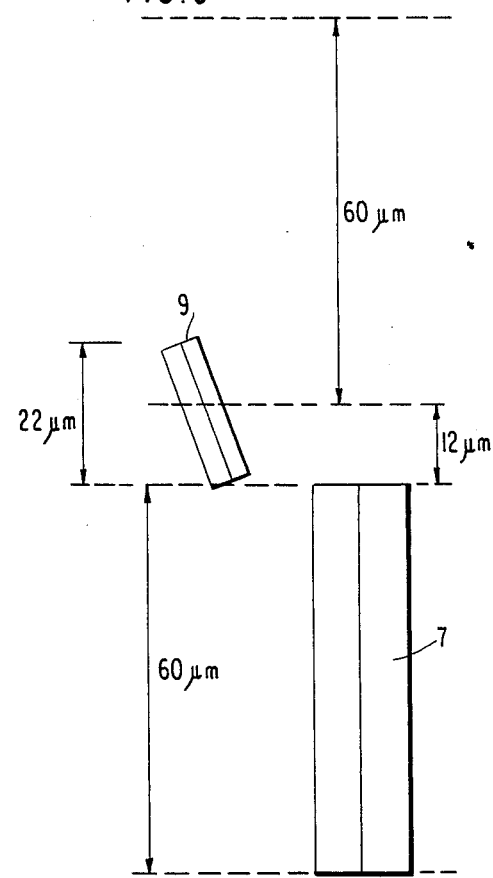
FIG. 9 is another illustration for describing the maximum information head width.

On the other hand, in the case that a minimum width guard band in a 12 micrometer non-recorded portion is obtained due to the maximum tracking dislocation caused by humidity and temperature errors and the tracking error, the width becomes 22 micrometers by the addition of the width of 10 micrometers in which the overwriting is permitted. That is, as shown in FIG. 9, when the data is recorded by the data head 9 the tracking is controlled by the adjacent main head 7 reproducing the main track. Since this tracking accuracy error is included in the non-recorded portion of 12 micrometers, the data head can have a width of 10+12 micrometers, i.e., 22 micrometers, in the track-width direction from the side of the main head 7. Even if during the data reproduction the tracking for this data track is controlled by the data head 9 itself so as to produce a tracking error accuracy of ±3 micrometers, the track width of 10 micrometers required for the reproduction can be obtained. Therefore, the data head 9 can be used which is adjacent to the side of the main head and which has a head width of 22 micrometers at a maximum.

Thus, in this example, if the data head is arranged so as to be adjacent to the one end side of the main head and to have a width of the maximum 22 micrometers, excellent data recording can be achieved without degrading the main track.

Figure 10A:
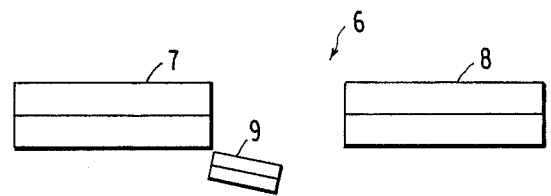
FIG. 10(a) and FIG. 10(b) show examples of two combined magnetic heads.
Figure 10B:
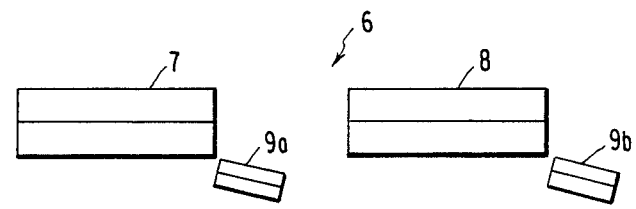

In the above description and as shown in FIG. 10(a) the arrangement is such that there are a pair of two-channel main heads 7 and 8 and the data head 9 is adjacent to one of these the main head 7. However, it is also appropriate that the data head 9 is arranged to be adjacent to the side of the other main head 8. Furthermore, it is appropriate, as shown in FIG. 10(b) that two data heads 9a and 9b are respectively provided on the sides of both main heads 7 and 8 since data such as voice data can be recorded at both the outer sides. This recording of data on both sides occurs in the case of field recording in which the main heads 7 and 9 are used independently of each other or in the case of frame recording in which the main heads 7 and 8 are used simultaneously.

Figure 11:
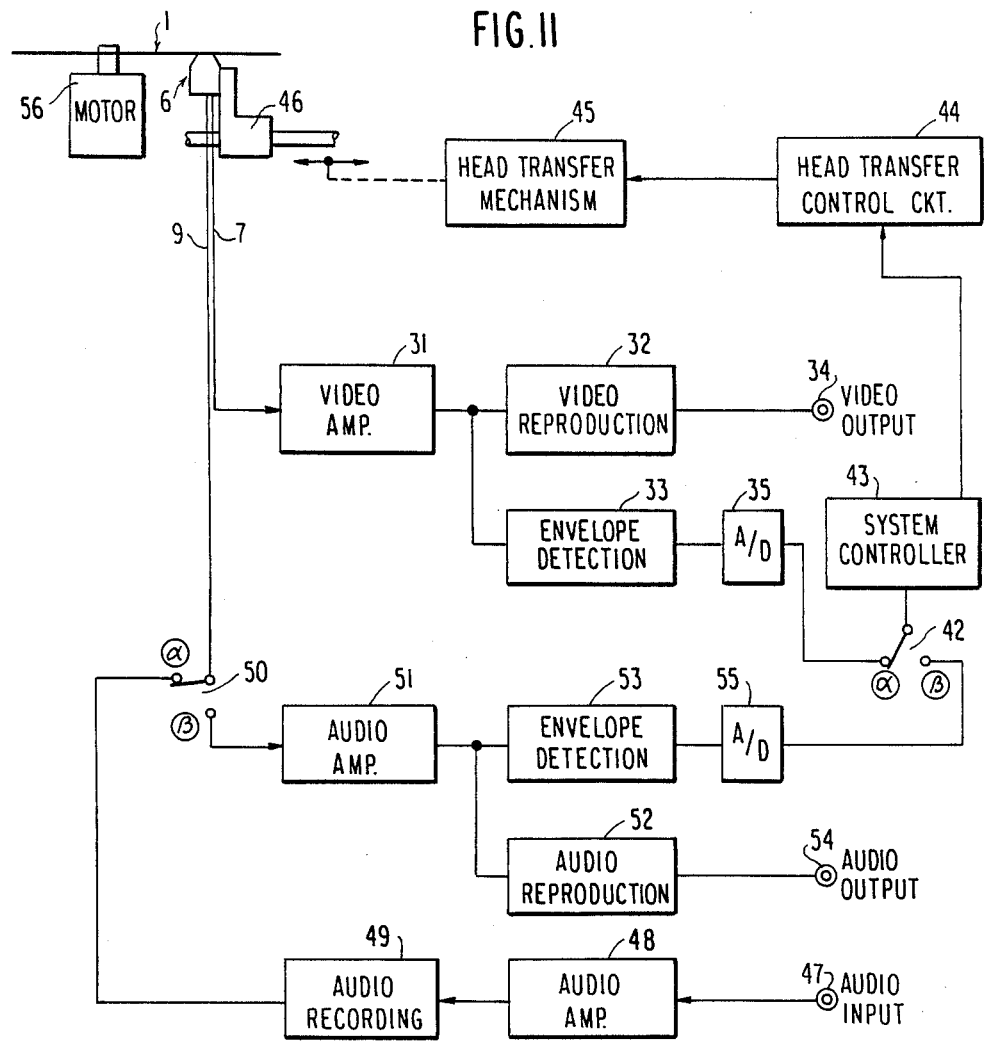
FIG. 11 is a block diagram showing another tracking circuit.
Figure 12:
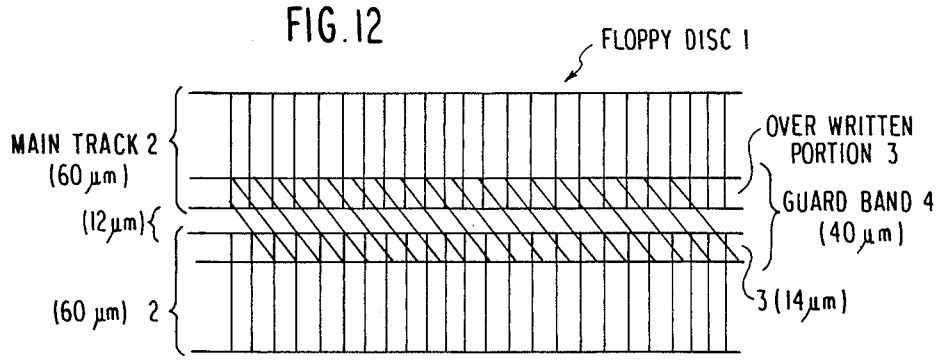
FIG. 12 is an illustration for describing the maximum tracking dislocation of a main track.

An apparatus shown in FIG. 11 is arranged such that a voice signal is recorded on a guard band of a floppy disk 1 on which image signals are recorded on first and second main tracks on either side of the guard band irrespective of the width of the guard band. With this apparatus, these image and voice signals are simultaneously reproduced by means of a magnetic head 6. This apparatus of FIG. 11 is similar in structure to that of FIG. 7. While in the apparatus of FIG. 7 the envelopes of the FM image signals of two main tracks are detected and compared with each other by the comparator 41, the apparatus of FIG. 11 is arranged so that the envelope of only one main track is detected. The output signal of the A/D converter 35 receiving the envelope signal is supplied to the system controller 43. The system controller 43 moves, in a radial direction of the floppy disk 1, the head carriage 46, to which the head 6 is fixedly secured. The movement is controlled through a head transfer control circuit 44 and a head transfer mechanism 45. The above control occurs when the switch 42 is set to the contact point α.

When, with this apparatus, a voice signal is to be recorded on a guard band, the switches 42 and 50 are set to contact points α. In this state, the voice signal is supplied to the audio input terminal 47 and an image signal of the first main track is produced through the first video head 7. At this time, the system controller 43 adjusts the position of a magnetic head 6 so that the output level of the A/D converter 35 assumes a maximum. That is, the tracking servo is performed so that the video head 7 is placed on the first main track.

On the other hand, in reproducing the voice signal, the switch 42 is set to either the contact point α or the contact point β but the switch 50 is set to the contact point β. In this state, the image signal of the first main track is reproduced by means of the first video head 7 and the voice signal of the guard band is reproduced by means of the audio head 9. At this time, when the tracking is performed by the image signal, the system controller 43 adjusts the position of the magnetic head 6 so that the output level of the A/D converter assumes a maximum. On the other hand, when the tracking is performed by the voice signal itself, the system controller 43 adjusts the position of the magnetic head 6 so that the output of the A/D converter 55 assumes a maximum.

SPECIFIC EMBODIMENT

Figure 1A:
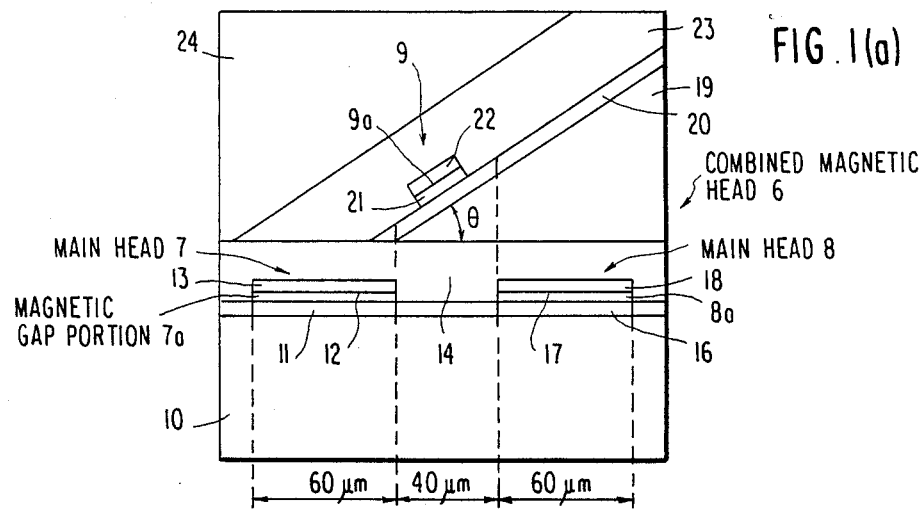
FIG. 1(a) shows an arrangement of a thin-film magnetic head and FIG. 1(b) shows another arrangement of a thin-film magnetic head.
Figure 1B:
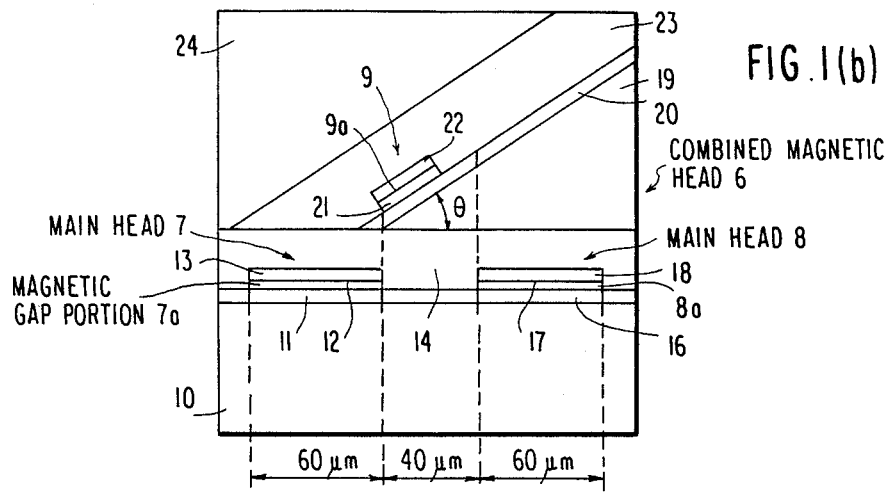

A combined magnetic head of the present invention, fabricated as a thin film head, is illustrated in FIGS. 1(a) and 1(b). This combined magnetic head 6 has two main heads 7 and 8 and a data head 9 for use with guard bands. The two main heads 7 and 8 and the data head 9 are constructed integrally. In detail, each of the magnetic heads 7, 8, and 9 has a magnetic layer, a conductive layer, and an insulating layer, each set being a thin film magnetic head. In FIG. 1(a), a magnetic alloy is sputtered on a magnetic ferrite-composition base plate 10 so as to form lower magnetic layers 11 and 16 of the main heads 7 and 8. On the lower magnetic layers 11 and 16 are formed insulating layers 12 and 17 on which coil conductors (not shown) are further formed. A magnetic alloy is sputtered on these laminated bodies so as to form upper magnetic layers 13 and 18 on which an intermediate guard layer 14 is formed. A thin film magnetic head 9 is joined on these magnetic heads 7 and 8 with a low melting-point glass or the like. The thin film magnetic head 9 similarly comprises a base plate 19, a lower magnetic layer 20, an insulating layer 21, a coil conductor (not shown), an upper magnetic layer 22, and a guard layer 23. A non-magnetic guard plate 24 is attached to the upper surface of the guard layer 23 with a low melting-point glass or the like.

The azimuth angles of the two main head 7 and 8 with respect to the tracks are both zero and they have magnetic gap portions 7a and 8a each forming a track of a width of 60 micrometers. Furthermore, the two magnetic heads 7 and 8 are arranged so that the magnetic gap portions 7a and 8a are separated from each other by 40 micrometers in the track-width direction so as to form a guard band of 40 micrometers. On the other hand, the data head 9 for the guard band has an azimuth angle of 45° and is placed in the 40 micrometer guard band. It further has a magnetic gap portion 9a for forming a track of 16 to 26 micrometers in the track-width direction as described above. Therefore, the head width itself of the data head 9 has a length of √2 times of 16 to 26 micrometers because the azimuth angle is 45°.

The embodiment shown in FIG. 1(a) is arranged such that the center of the data head gap portion 9a is positioned at the center between the main heads 7 and 8. On the other hand, the embodiment shown in FIG. 1(b) is arranged such that an end of the information gap portion 9a is positioned to be aligned with respect to an end of one main head 7 or 8 to form a data track of 16 to 22 micrometers in the track-width direction, as described above.

As described above, according to the present invention, it is possible to record data information excellently on a guard band without degrading information on a main track irrespective of overwriting due to off-tracking.

What is claimed is:

1. A combined magnetic head comprising:
   two main heads for forming main tracks on a recording medium, said main heads being separated from each other in a width direction of said main tracks of said recording medium by a predetermined distance; and
   a data head fixed to said main heads and having a width in said width direction of between 2/5 to 3/5 of said predetermined distance.

2. A combined magnetic head as recited in claim 1, wherein said data head is positioned within said interval.

3. A combined magnetic head as claimed in claim 1, wherein said data head has an azimuth angle with respect to said main heads.

4. A combined magnetic head as claimed in claim 3, wherein said azimuth angle is 10° to 40°.

5. A combined magnetic head, comprising:
   two main heads for forming main tracks on a recording medium, said main heads being separated by a predetermined distance and formed in a line in a track-width direction of said recording medium moving with respect to said combined magnetic head; and
   a data head having a width smaller than that of said predetermined distance between said two main heads, wherein said data head is closer to one of said two main heads than to the other of said two main heads, and wherein said data head is positioned at a non-zero azimuth angle with respect to said two main heads.

6. A combined magnetic head as recited in claim 5, wherein said azimuth angle is 10° to 40°.

* * * * *